Dec. 18, 1945.  P. H. HARRER  2,391,018
ROTARY BALER
Filed March 8, 1944  2 Sheets-Sheet 1

Inventor
P. H. Harrer
by K. S. Wyman
Attorney

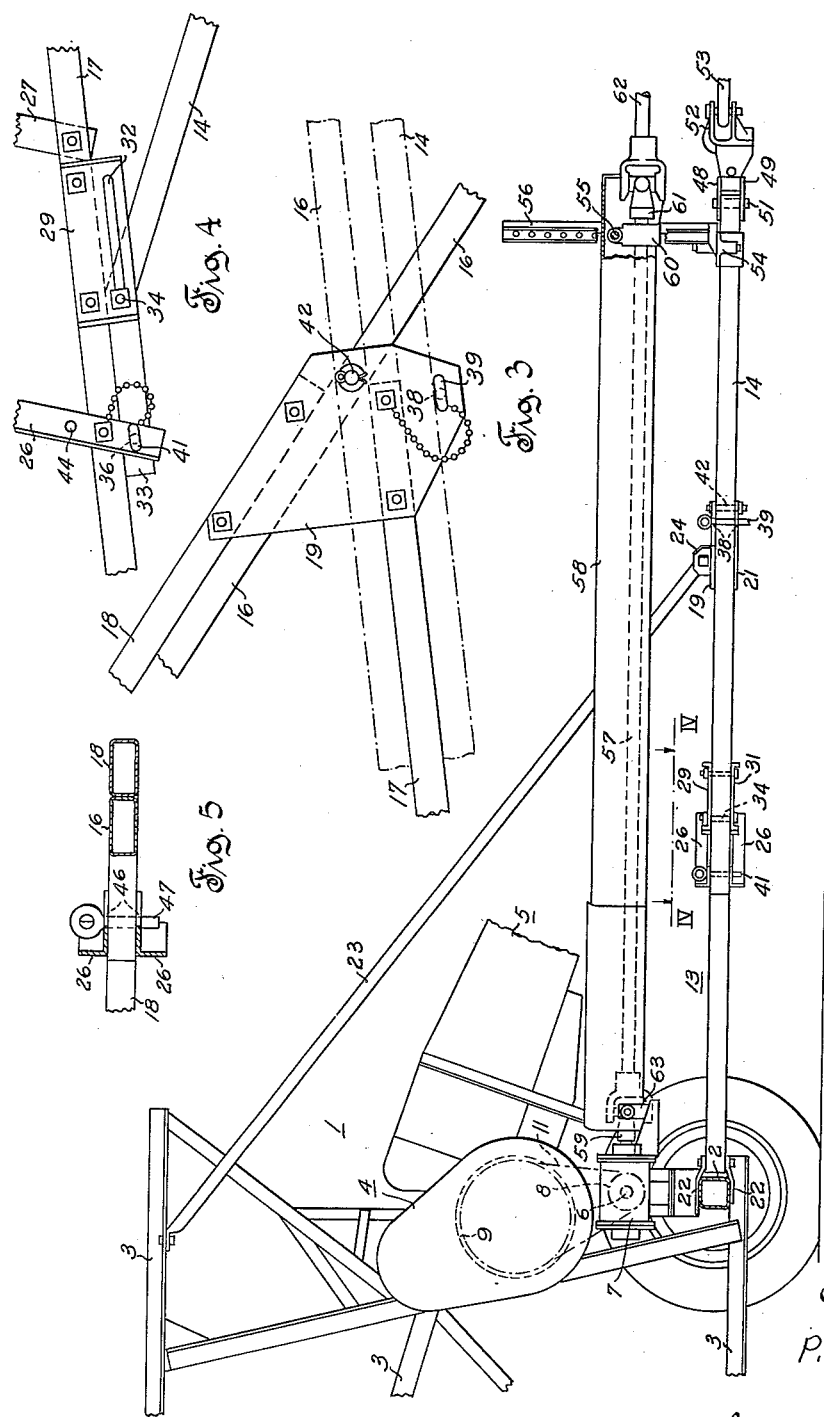

Patented Dec. 18, 1945

2,391,018

UNITED STATES PATENT OFFICE 2,391,018

ROTARY BALER

Paul H. Harrer, La Porte, Ind., assignor to Allis-Chalmers Manufacturing Company, Milwaukee, Wis., a corporation of Delaware Application March 8, 1944, Serial No. 525,483

19 Claims. (Cl. 280—33.44)

This invention relates to draft gear for vehicles, machines, implements and the like (hereinafter called vehicles) of the type adapted to be hitched to and drawn behind a tractor or other suitable draft means in either one of two predetermined positions and has for its primary object the provision of an improved draft gear which is simple and inexpensive to manufacture and install, which is extremely sturdy, and which can be quickly shifted from one position to the other with minimum effort.

A further object of this invention is to provide an improved draft gear which in connection with the transmission of power from the draft means to the drawn means affords an excellent support for the forward end of the power transmitting shaft when in either of said two positions.

The construction and the application of apparatus embodying the invention will become apparent as the disclosure progresses and particularly points out additional objects, advantages and features of construction which are considered of special importance and of general application although shown and described as applied to a baling machine of the type disclosed in U. F. Luebben's Patents U. S. 2,096,990 and 2,336,491, issued October 26, 1937 and December 14, 1943, respectively.

Accordingly the invention may be considered as consisting of the various details of construction, correlations of features and arrangements of parts as is more fully set forth in the appended claims and in the detailed description, in which:

Fig. 2 is a partial side elevation of the structure shown in Fig. 1 with parts broken away or removed to show the correlation of parts;

Fig. 3 is an enlarged plan view of the forward end of the rigid frame structure with the tie rod omitted;

Fig. 4 is an enlarged plan view taken on line IV—IV of Fig. 2; and

Fig. 5 is a partial section taken on line V—V of Fig. 1.

Figure 1:
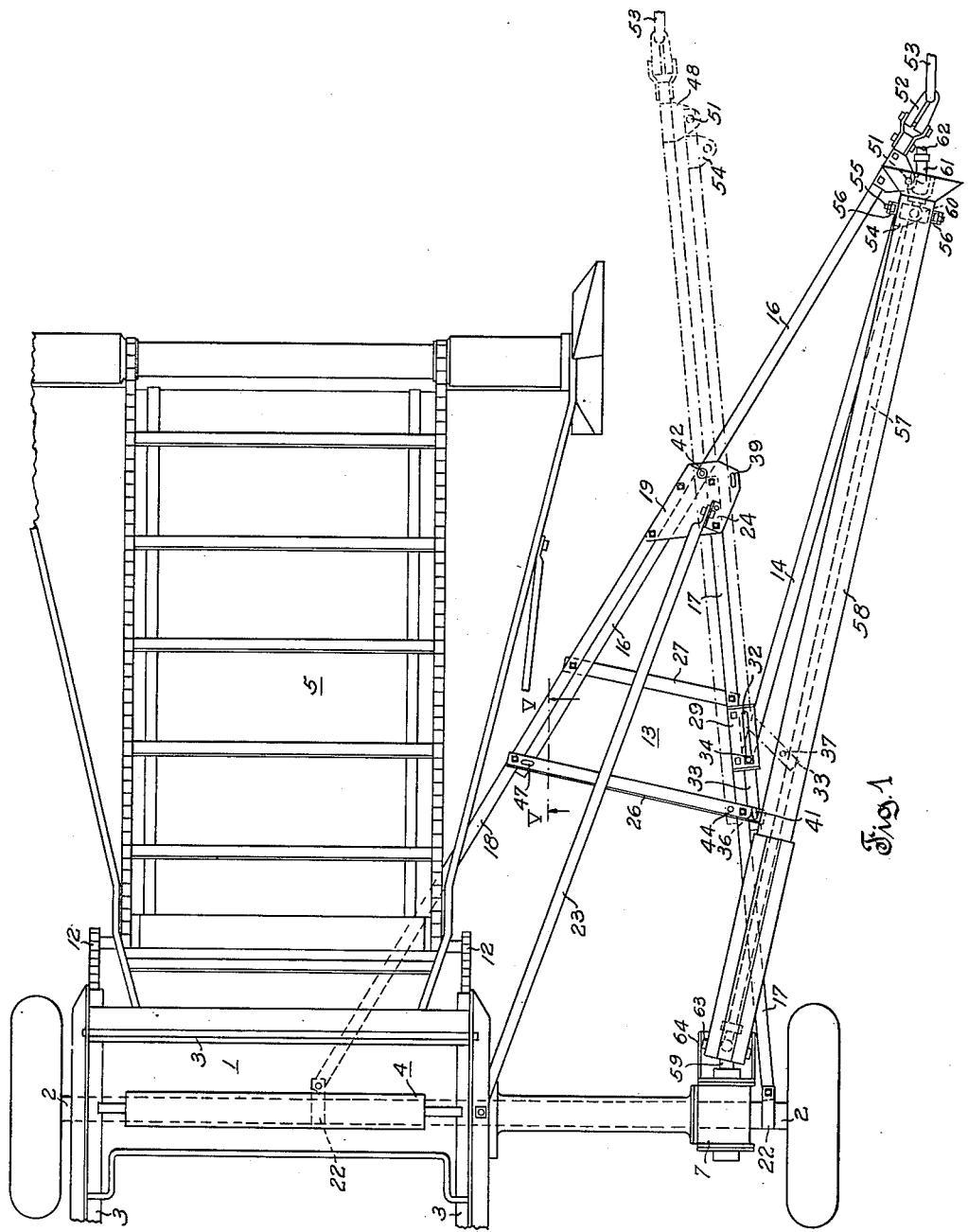
Fig. 1 is a plan view of a rotary baler embodying the invention with parts broken away to better show the arrangement of parts.

Referring to Figs. 1 and 2 of the drawings, it is seen that the invention may be applied to a vehicle I embodying a rigid, wheel supported axle 2 on which is supported a rigid frame structure 3 operatively mounting apparatus 4 for treating fibrous material such as hay, vines, leaves and the like delivered thereto, a pickup conveyor 5 for delivering material to the apparatus 4, and a power shaft 6 enclosed in a housing 7 carried by the axle 2 and drivingly connected with the apparatus 4 by means of sprockets 8, 9 and a chain 11. The conveyor 5 may be driven from a suitable part (not shown) of apparatus 4 by means of chains 12 as indicated in Fig. 1. However, the detailed construction and correlation of the parts thus far identified are not essential for a complete understanding of the present invention and a further description of same is deemed unnecessary. However, if additional information is desired in this connection, reference may be had to the hereinbefore identified Luebben patents.

The vehicle I is provided with a draft means comprising a forwardly extending rigid frame 13 and a pair of relatively movable rigid tongue members 14 and 16 mounted in forwardly extending relation on frame 13. In this connection, frame 13 is formed by a pair of rigid side members 17 and 18 which have their forward ends fixedly secured in proximate spaced relation by means of upper and lower plate members 19 and 21 bolted or otherwise secured to top and bottom surface portions of the members 17 and 18 as best shown in Fig. 3 and which extend rearward in diverging relation from the forward end thereof and have their rear ends fixedly secured to laterally spaced portions of the axle 2 by means of connections 22. The forward end of frame 13 is braced by a vertically extending tie rod 23 connected at one end with a rigid bracket 24 carried by upper plate member 19 and at its other end with a top portion of the vehicle frame structure 3 and additional bracing is effected by a pair of transverse rigid members 26 having their opposite end portions secured to intermediate opposed top and bottom surface portions of the members 17 and 18 and by a transverse rigid member 27 having its opposite ends secured to bottom surface portions of the members 17 and 18 at points between the plates 19, 21 and the braces 26.

Frame member 17 has secured thereto a slight distance forward of the braces 26, upper and lower rigid laterally extending parallel plates 29 and 31 having their inner opposed surfaces substantially flush with the contiguous top and bottom surface portions of member 17 and having therein opposed slots 32 which extend parallel to member 17. Tongue member 14 has a laterally offset rear end portion 33 and is pivotally mounted between plates 29 and 31 for both sliding and angular movement relative thereto by means of an interconnecting pin member 34 which extends through the slots 32 and an alined hole formed in tongue member 14 substantially at the junction of the main and offset portions thereof. The adjacent ends of the braces 26 extend outward beyond the outer side edge of side member 17 and are provided with alined holes 36 therethrough arranged for alinement with a hole 37 in the outer end of the offset portion 33 of tongue member 14 when the main portion of said tongue member is disposed at an angle to side member 17 as shown in Fig. 1. Upper and lower plates 19 and 21 on the forward end of frame structure 13 also extend outward beyond the outer side edge of side member 17 a distance greater than the width of tongue member 14 and are provided with alined holes 38 adapted to receive a pin 39. The shape of tongue member 14, the location of the holes 36 in the braces 26, and the arrangement of the plates 19, 21 and 29, 31 and of the alined holes and slots therein is such that when tongue member 14 is in the full line position shown in Fig. 1, the offset portion 33 is in parallel abutting relation against the outer side surface of frame member 17 and between the outwardly projecting ends of the braces 26 with the pin 34 disposed at the rear end of slot 32 and with hole 37 alined with the holes 36 in the braces 26 and is securely held in such position by the pin 34 and by inserting a pin 41 through the holes 36, 37, and that when the tongue 14 is in the dotted line position shown in Fig. 1, the offset rear end portion is disposed in angle to frame member 17 with the pin 34 disposed at the forward end of slot 32 and with its main portion disposed alongside frame member 17 in abutting, extension-forming relation thereto and between the projecting portions of the plates 19 and 21 and is securely held in such position by the pin 34 and the insertion of pin 39 through the alined holes 38 in the plates 19 and 21.

Tongue member 16 extends through the opening provided by the spaced relation of the forward ends of frame members 17 and 18 and the plates 19 and 21 secured thereto, over the brace member 27 and between the brace members 26; said opening permitting member 16 to be swung from its full line position to its dotted line position shown in Figs. 1 and 3. In this connection, longitudinal movement of tongue member 16 is prevented by a pivot connection, pin 42, which extends through alined openings in the plates 19 and 21 and through an alined opening in tongue member 16 as best shown in Fig. 3; the arrangement of parts being such that said tongue member is held immovable longitudinally by pin 42 and is supported at all times by the plates 19, 21 and by the braces 26 and 27 as previously indicated. The rear end of tongue member 16 is provided with a vertical hole therethrough adapted for alinement with either pair of alined holes 44 and 46 provided in the brace members 26 adjacent the frame members, 17 and 18, respectively, and member 16 can be readily secured in abutting relation against frame member 17 or against frame member 18 simply by alining the hole in the rear end of the tongue member with either the holes 44 or 46 and inserting a pin therethrough; pin 41 being adapted for insertion in the holes 44 and a pin 47 being adapted for insertion in the holes 46 as indicated in Figs. 4 and 5.

The forward end of tongue member 16 has bolted or otherwise secured thereto upper and lower laterally projecting parallel plates 48 and 49 between which extends the forward end of tongue member 14; the tongue members being pivotally connected for relative angular movement by means of alined holes in the plates 48 and 49 and a hole in the end of tongue member 14 through which extends a pivot pin or the like 51. It should now be obvious that the tongue members are interconnected and mounted in forwardly extending relation on the rigid frame 13 for selective coordinated movement to a position in which both tongue members extend alongside, that is in abutting relation against, opposite side surfaces of frame member 17 in extension forming relation thereto or to a position in which tongue member 16 extends alongside, that is in abutting relation against, the inner side surface of frame member 18 in extension forming relation thereto and tongue member 14 extends at an angle to frame member 17 with its offset rear end portion 33 abutting same, and that the tongue members can be readily secured either in the dotted line position shown in Fig. 1 by inserting the pin 39 through the holes 38 in plates 19 and 21 and the pin 41 through the holes 44 in brace members 26 or in the full line position shown in Fig. 1 by inserting pins 41 and 47 through the holes 36 and 46, respectively, in the brace members 26.

The forward end of tongue member 16 has secured thereto a hitch clevis 52 adapted for connection with the draw bar 53 of a tractor or other suitable means for drawing vehicle 1 and the forward end portion of tongue member 14 is provided with an offset bracket 54 pivotally mounting a vertically extending bifurcated support 56 for the forward end of a power transmitting shaft 57 and the forward end of a guard or shield member 58 for the shaft 57. The rear end of shaft 57 is universally connected with and supported by the forward end of a stub shaft 59 which projects from the adjacent end of the axle supported housing 7 and which is drivingly connected with the shaft 6 in any suitable manner such as by gearing (not shown). The forward end of shaft 57 is provided with a bearing 60 which is connected with support 56 by means of a bolt or the like 55 and with a universal coupling 61 adapted to connect shaft 57 with the rear end of a power take off shaft 62 on the tractor or other means to which the vehicle 1 is hitched. The rear end of the shield 58 for shaft 57 is pivotally mounted on a support 63 carried by a rigid bracket 64 secured to the housing 7 on axle 2. The arrangement of these parts is in effect such that the rigid power transmission shaft 57 and the shield 58 both have their rear ends pivotally supported on the axle 2 and their forward ends supported on and carried by the forward end of the tongue member 14 for movement therewith. Consequently, both the tongue members 14 and 16 and the power transmission means comprising shaft 57 and the shield 58 therefor are interconnected and mounted for coordinated movement in a manner rendering same selectively positionable as indicated in Figs. 1 and 3.

The invention is applicable to all types of vehicles adapted to be hitched to and drawn behind a tractor or other suitable means in either one of two predetermined positions and it should therefore be understood that it is not desired to limit the invention to the exact construction and correlation of parts herein shown and described for purposes of illustration as various modifications within the scope of the appended claims may occur to persons skilled in the art.

It is claimed and desired to secure by Letters Patent:

1. A draft gear for vehicles comprising a pair of rigid side members secured together in angularly disposed, fixed relation, and a pair of rigid interconnected tongue members carried by said side members for selective coordinated movement to and retention in either a first position in which both tongue members are disposed alongside one of said side members in extension forming relation thereto or a second position in which one of said tongue members is disposed alongside the other one of said side members in extension forming relation thereto and the other one of said tongue members is disposed at an angle to said one side member with its rear end engaging same.

2. A draft gear for a vehicle adapted to be hitched to and drawn behind a draft means in either one of two predetermined positions comprising a rigid frame adapted to be fixedly secured to the vehicle in forwardly extending relation thereto, said frame including a pair of rigid side members which extend rearward in diverging relation from the forward end thereof, a pair of rigid tongue members interconnected for relative movement, and means mounting said tongue members on said frame to extend forwardly therefrom either in a position in which both members are disposed alongside one of said side members in extension forming relation thereto or in a position in which one of said tongue members is disposed alongside the other one of said side members in extension forming relation thereto and the other one of said tongue members is disposed at an angle to said one side member with its rear end engaging same.

3. In a draft gear for a vehicle adapted to be hitched to and drawn behind a draft means in either one of two predetermined positions, a frame adapted to be secured to a vehicle in forwardly extending relation thereto, said frame including a pair of rigid side members which extend rearward in diverging relation from the forward end thereof, and means for attaching the forward end of said frame to a draft means comprising a pair of rigid tongue members having their forward ends pivotally connected for relative angular movement and having their rear portions mounted on said frame for coordinated movement to a position in which both tongue members extend alongside of and a considerable distance beyond the forward end of one of said side members and to a position in which one of said tongue members extends alongside of and a considerable distance beyond the forward end of the other one of said members and the other one of said tongue members extends at an angle to said one side member with its rear end engaging same.

4. In a draft gear for a vehicle adapted to be hitched to and drawn behind a draft means in either one of two predetermined positions, a frame adapted to be secured to a vehicle in forwardly extending relation thereto, said frame including a pair of rigid side members which extend rearward in diverging relation from the forward end of the frame, and means for attaching the forward end of said frame to a draft means comprising a first rigid tongue member movably mounted on the forward end of said frame and positionable to extend alongside of and a considerable distance beyond the forward end of either one of said side members, and a second rigid tongue member having its forward end pivotally connected to the forward end of said first member and being mounted on said frame for coordinated movement with said first member to a position in which both members are disposed alongside of and extend a considerable distance beyond the forward end of one of said side members and to a position in which said first member is disposed alongside of and extends a considerable distance beyond the forward end of the other one of said side members and said second member is disposed at an angle to said one side member with its rear end engaging an intermediate portion of the said one member.

5. A draft gear for a vehicle adapted to be hitched to and drawn behind a draft means in either one of two predetermined positions comprising a frame adapted to be secured to the vehicle in forwardly extending rigid relation thereto, said frame including a pair of rigid side members which extend rearward in diverging relation from the forward end thereof, a first rigid tongue member movably mounted on said frame to extend alongside of and considerably beyond the forward end of either one of said side members, a second rigid tongue member movably mounted on said frame to extend either alongside of and considerably beyond the forward end of one of said side members or at an angle to said one side member with its rear end engaging same, and means pivotally uniting the forward ends of said tongue members for coordinated movement to a position in which both tongue members extend alongside of and considerably beyond the forward end of said one side member and to a position in which said first member extends alongside of and considerably beyond the forward end of the other one of said side members and said second member extends at an angle to said one side member with its rear end engaging same.

6. A draft gear for a vehicle adapted to be hitched to and drawn behind a draft means in either one of two predetermined positions comprising a rigid frame adapted to be secured to the vehicle in forwardly extending relation thereto, said frame including a pair of rigid side members which extend rearward in diverging relation from the forward end thereof, a first rigid tongue member movably mounted intermediate its ends on the forward end of said frame for selectively positioning said first member alongside either one of said side members in extension forming relation thereto, a second rigid tongue member having an offset rear end part and being movably mounted on an intermediate portion of one of said side members for selectively positioning said second member either alongside said one side member in extension forming relation thereto or at an angle to said one side member with said offset end part engaging same, and means connecting said tongue members for relative movement to a position in which both members are disposed alongside said one side member in extension forming relation thereto and to a position in which said first member is disposed alongside the other one of said side members in extension forming relation thereto and said second member is disposed at an angle to said one side member with its offset end part engaging same.

7. A draft gear for vehicles adapted to be hitched to and drawn behind a draft means in either one of two predetermined positions comprising a rigid frame adapted to be secured to the vehicle in forwardly extending relation thereto, said frame including a pair of rigid side members which extend rearward in diverging relation from the forward end thereof, a first rigid tongue member having an intermediate portion pivotally mounted on the forward end of said frame for selectively positioning said first member alongside either one of said side members in extension forming relation thereto, a second rigid tongue member having an offset rear end part and being pivotally mounted on an intermediate portion of one of said side members for selectively positioning said second member either alongside said one side member in extension forming relation thereto or at an angle to said one side member with said offset end part engaging same, means connecting said tongue members for coordinated movement to a position in which both of said members are disposed alongside said one side member in extension forming relation thereto and to a position in which said first member is disposed alongside the other one of said side members in extension forming relation thereto and said second member is disposed at an angle to said one side member with its offset end part engaging same, means for retaining said tongue and side members united in the positions specified, and means for securing the forward end of said tongue members to a draft means.

8. A draft gear for vehicles adapted to be hitched to and drawn behind a draft means in either one of two predetermined positions comprising a rigid frame adapted to be secured to the vehicle in forwardly extending relation thereto, said frame including a pair of rigid side members which extend rearward in diverging relation from the forward end thereof and have their forward ends secured in proximate spaced relation, a first rigid tongue member having an intermediate portion pivotally mounted on said frame between the forward ends of said side members for selectively positioning said first member alongside the opposed inner side surface of either one of said side members in extension forming relation thereto, a second rigid tongue member having an offset rear end part and being pivotally mounted on an intermediate portion of one of said side members for selectively positioning said second member either alongside the outer side surface of said one side member in extension forming relation thereto or at an angle to said one side member with said offset end part engaging said outer side surface, means connecting said tongue members for coordinated movement to a position in which both of said members are disposed alongside opposite sides of said one side member in extension forming relation thereto and to a position in which said first member is disposed alongside the inner side surface of the other one of said side members in extension forming relation thereto and said second member is disposed at an angle to said one side member with its offset end part engaging said outer side surface, means for retaining said tongue and side members united in the relative positions specified, and means for securing the forward ends of said tongue members to a draft means.

9. In a vehicle adapted to be hitched to and drawn behind a draft means in either one of two predetermined positions, a forwardly extending rigid frame secured to the vehicle and including a pair of side members which extend rearward toward the vehicle in diverging relation, and a pair of rigid interconnected tongue members carried by said frame for selective coordinated movement to and retention in either a first position in which both tongue members are disposed alongside one of said side members in extension forming relation thereto or a second position in which one of said tongue members is disposed alongside the other one of said side members in extension forming relation thereto and the other one of said tongue members is disposed at an angle to said one side member with its rear end engaging same.

10. In a vehicle adapted to be hitched to and drawn behind a draft means in either one of two predetermined positions, means including an integral part of the vehicle forming a rigid forwardly extending frame having a pair of side members which extend rearward toward the vehicle in diverging relation, and means for attaching the forward end of said frame to a draft means comprising a pair of rigid tongue members having their forward ends pivotally connected for relative angular movement and having their rear portions mounted on said frame for coordinated movement to a position in which both tongue members extend alongside of one of said side members in extension forming relation thereto and to a position in which one of said tongue members extends alongside the other one of said side members in extension forming relation thereto and the other one of said tongue members extends at an angle to said one side member with its rear end engaging same.

11. In a vehicle adapted to be hitched to and drawn behind a draft means in either one of two predetermined positions and embodying power driven apparatus, a forwardly extending rigid frame secured to the vehicle and including a pair of side members which extend rearward toward the vehicle in diverging relation, a pair of rigid interconnected tongue members carried by said frame for selective coordinated movement to and retention in either a first position in which both tongue members are disposed alongside one of said side members in extension forming relation thereto or a second position in which one of said tongue members is disposed alongside the other one of said side members in extension forming relation thereto and the other one of said tongue members is disposed at an angle to said one side member with its rear end engaging same, and means for transmitting power to said apparatus comprising a shaft having its rear end pivotally connected with and supported by a part of said apparatus carried by said vehicle and having its forward end supported on and carried by said tongue members for movement therewith.

12. In a vehicle adapted to be hitched to and drawn behind a draft means in either one of two predetermined positions and embodying power driven apparatus, means including an integral part of the vehicle forming a rigid forwardly extending frame having a pair of side members which extend rearward toward the vehicle in diverging relation, means for attaching the forward end of said frame to a draft means embodying a power take-off shaft comprising a pair of rigid tongue members having their forward ends pivotally connected for relative angular movement and having their rear portions mounted on said frame for coordinated movement to a position in which both tongue members extend alongside of one of said side members in extension forming relation thereto and to a position in which one of said tongue members extends alongside the other one of said side members in extension forming relation thereto and the other one of said tongue members extends at an angle to said one side member with its rear end engaging same, and means for connecting said apparatus with said power take-off shaft comprising a power transmitting shaft having its rear end pivotally connected with a part of said apparatus carried by said vehicle and having its forward end supported on and carried by said tongue members for movement therewith.

13. In a vehicle adapted to be hitched to and drawn behind a draft means in either one of two predetermined positions and embodying power driven apparatus, means forming with an integral part of said machine a forwardly extending rigid frame having a pair of side members which extend rearward toward the vehicle in diverging relation, a pair of interconnected rigid tongue members mounted on said frame to extend forwardly therefrom either in a position in which both tongue members are disposed alongside one of said side members in extension forming relation thereto or in a position in which one of said members is disposed alongside the other one of said side members in extension forming relation thereto and the other one of said members is disposed at an angle to said one side member with its rear end engaging same, and means for transmitting power to said apparatus comprising a rigid shaft having its rear end pivotally connected with a part of said apparatus fixedly mounted on said vehicle and having its forward end supported on and carried by said tongue members for movement therewith.

14. In a vehicle adapted to be hitched to and drawn behind a draft means in either one of two predetermined positions and embodying power driven apparatus, means including an integral part of the vehicle forming a rigid forwardly extending frame having a pair of side members which extend rearward toward the vehicle in diverging relation, means for attaching the forward end of said frame to a self-propelled draft means embodying a power take-off shaft comprising a pair of rigid tongue members having their forward ends pivotally connected for relative angular movement and having their rear portions mounted on said frame for coordinated movement to a position in which both tongue members extend alongside of one of said side members in extension forming relation thereto and to a position in which one of said tongue members extends alongside the other one of said side members in extension forming relation thereto and the other one of said tongue members extends at an angle to said one side member with its rear end engaging same, and means for connecting said apparatus with said power take-off shaft comprising a power transmitting shaft having its rear end pivotally supported on said part and having its forward end supported on and carried by the forward end of said tongue members for movement therewith.

15. In a vehicle adapted to be hitched to and drawn behind a draft means in either one of two predetermined positions and embodying power driven apparatus, means including an integral part of the vehicle forming a rigid forwardly extending frame having a pair of side members which extend toward the vehicle in diverging relation, means for attaching the forward end of said frame to a self propelled draft means having a power take-off shaft comprising a rigid tongue member pivoted intermediate its ends on the forward end portion of said frame with its rear portion disposed between said side members for movement to and retention in either a first position in which said tongue member projects forwardly from said frame in side abutting, extension forming relation with respect to one of said side members or a second position in which said tongue member projects forwardly from said frame in side abutting, extension forming relation with respect to the other one of said side members, and means for connecting said apparatus with said power take-off shaft comprising a power transmitting shaft having its rear end pivotally connected with and supported by said part and having its forward end supported on and carried by the forward end of said tongue member for movement therewith.

16. In a vehicle adapted to be hitched to and drawn behind a draft means in either one of two predetermined positions and embodying power driven apparatus, means including an integral part of the vehicle forming a rigid forwardly extending frame having a pair of side members which extend rearward toward the vehicle in diverging relation, a rigid tongue member pivoted intermediate its ends on the forward end portion of said frame for movement to and retention in a first position in which said tongue member projects forwardly from said frame in side abutting, extension forming relation with respect to one of said side members or a second position in which said tongue member projects forwardly from said frame in side abutting, extension forming relation with respect to the other one of said members, and means for transmitting power to said apparatus comprising a shaft having its rear end pivotally connected with and supported by a part of said apparatus carried by the vehicle and having its forward end supported on and carried by said tongue member for movement therewith.

17. A draft gear for vehicles comprising a rigid frame structure including a pair of rigid side members secured together in fixed angularly disposed, forwardly converging relation, and a rigid tongue member pivoted intermediate its ends on the forward end portion of said frame structure for selective movement to and retention in a first position in which said tongue member projects forwardly from said frame structure in side abutting, extension forming relation with respect to one of said side members or in a second position in which said tongue projects forwardly from said frame structure in side abutting, extension forming relation with respect to the other one of said side members.

18. A draft gear for vehicles comprising a rigid frame structure including a pair of rigid side members secured together in fixed angularly disposed, forwardly converging relation, and a rigid tongue member pivoted intermediate its ends on the forward end portion of said frame structure with its rear portion extending between said side members for selective movement to and retention in a first position in which said tongue member projects forwardly from said frame structure in side-abutting, extension forming relation with respect to one of said side members or in a second position in which said tongue projects forwardly from said frame structure in side-abutting, extension forming relation with respect to the other one of said side members.

19. A draft gear for vehicles comprising a pair of rigid side members secured together in angularly disposed, fixed relation, and a pair of rigid interconnected tongue members carried by said side members for selective coordinated movement to and retention in either a first position in which both tongue members are disposed alongside one of said side members in extension forming relation thereto or a second position in which one of said tongue members is disposed alongside the other one of said side members in extension forming relation thereto and the other one of said tongue members is disposed at an angle with respect to said one side member.

PAUL H. HARRER.